United States Patent [19]
Eller

[11] 3,844,222
[45] Oct. 29, 1974

[54] CONVEYOR FOR WHEELED VEHICLES
[75] Inventor: Ronald L. Eller, Cahokia, Ill.
[73] Assignee: Passport Corporation, Maryland Heights, Mo.
[22] Filed: May 16, 1973
[21] Appl. No.: 360,799

[52] U.S. Cl. .................................. 104/172 B
[51] Int. Cl. .................................... B65g 19/22
[58] Field of Search ............ 104/172 B, 162, 176

[56] References Cited
UNITED STATES PATENTS
| | | | |
|---|---|---|---|
| 2,948,235 | 8/1960 | Stamler et al. | 104/162 |
| 3,058,433 | 10/1962 | Hurst | 104/172 B |
| 3,377,961 | 4/1968 | Hunt | 104/162 |
| 3,554,132 | 1/1971 | Hanna et al. | 104/172 B |
| 3,731,637 | 5/1973 | Hansen | 104/172 B |

Primary Examiner—M. Henson Wood, Jr.
Assistant Examiner—Andres Kashnikow
Attorney, Agent, or Firm—Gravely, Lieder & Woodruff

[57] ABSTRACT

A conveyor has wheel engaging rollers which operate over a wheel path and engage the peripheries of vehicle wheels from behind so as to move the wheels and vehicles along the path. The rollers also move over the path when returning to their starting positions, and they drop into depressions at their starting and terminal positions so as not to obstruct the passage of vehicle wheels over them. Fluid operated cylinders propel the wheel engaging rollers in both directions along the path.

11 Claims, 7 Drawing Figures

PATENTED OCT 29 1974

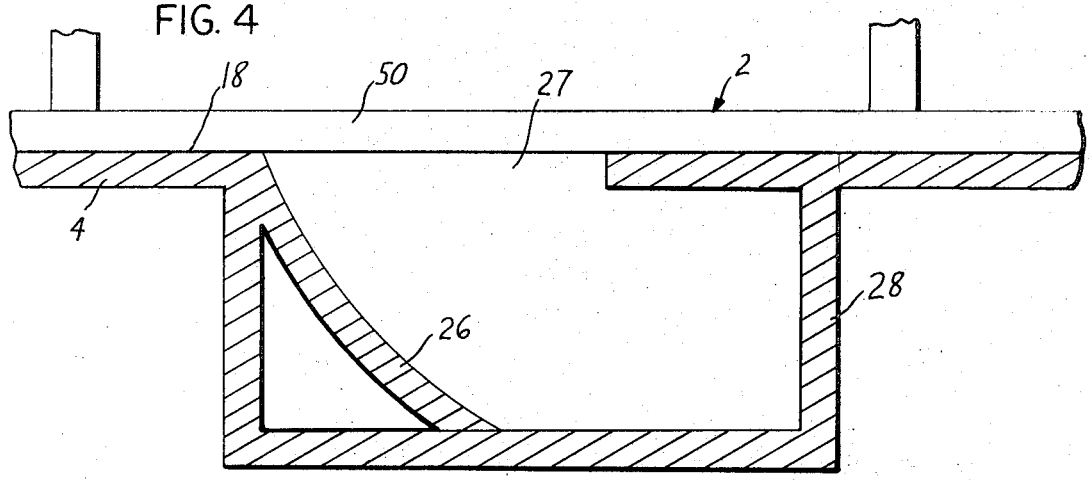
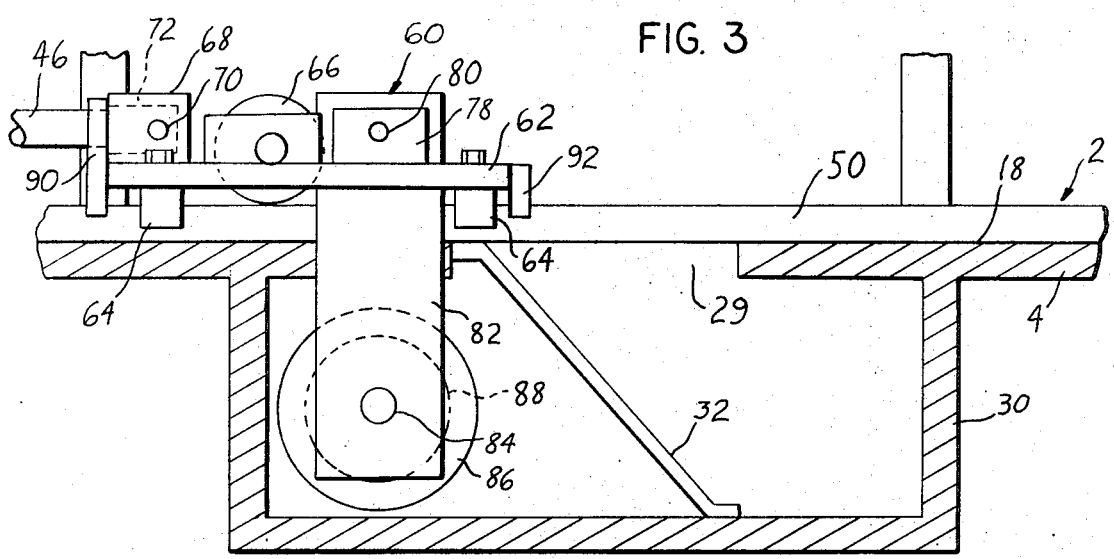
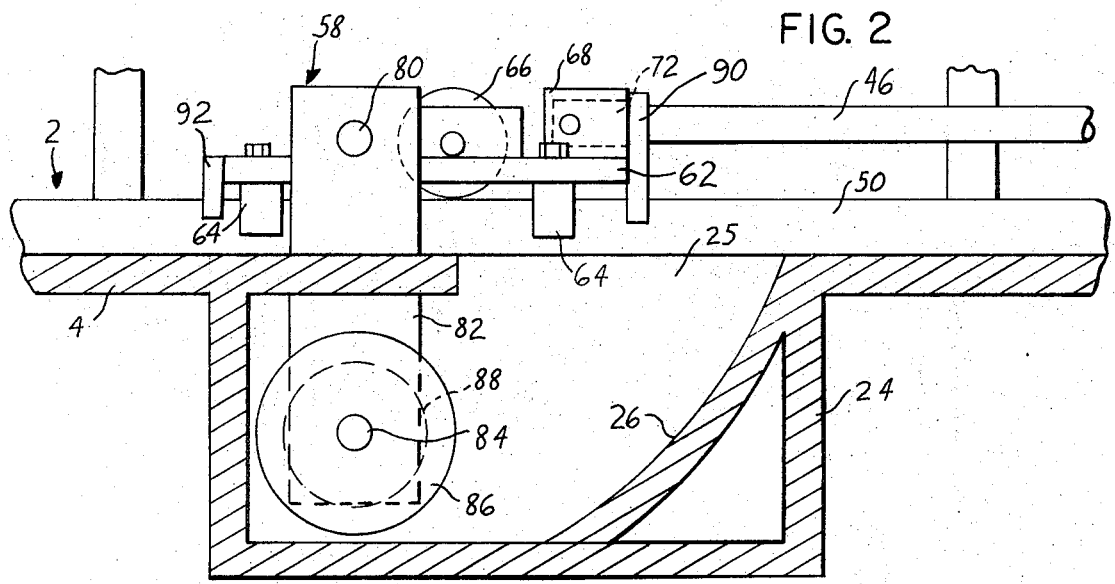

CONVEYOR FOR WHEELED VEHICLES

BACKGROUND OF THE INVENTION

This invention relates in general to conveyors, and more particularly to conveyors for moving wheeled vehicles.

The automatic car wash installations of current design utilize conveyors for moving automobiles past the water jets, brushes, and hot air nozzles which actually perform the washing and drying operations. The typical conveyor includes an endless chain which moves immediately below the path followed by the left wheels of the automobile being washed. This chain carries rollers which can be elevated to the path and positioned behind the left front wheel of an automobile at the beginning of the path. With continued movement of the chain the elevated roller engages the left front wheel and moves the entire vehicle through the car wash at a uniform velocity. Such a conveyor is disclosed in U.S. Pat. No. 3,554,132.

Conveyors of the foregoing construction are quite complex and have numerous moving parts. As a result they are expensive to manufacture and difficult to service. Moreover, they must be housed in a pit of substantial depth, and this further adds to the cost of the car wash installation. Since a pit must be provided for such conveyors they are not easily installed in existing buildings such as service station bays.

SUMMARY OF THE INVENTION

One of the principal objects of the present invention is to provide a conveyor capable of moving wheeled vehicles, and particularly automobiles, through automatic car wash installations. Another object is to provide a conveyor of the type stated which has a minimum number of moving parts. A further object is to provide a conveyor of the type stated which is easy to manufacture and service. An additional object is to provide a conveyor of the type stated which is extremely reliable and durable. Still another object is to provide a conveyor of the type stated which utilizes fluid cylinders in lieu of endless chains for moving the automobiles. Yet another object is to provide a conveyor which can be installed on the floor of a building with minimum alteration to the building floor. Still another object is to provide a conveyor which is ideally suited for installation in service station bays. These and other objects and advantages will become apparent hereinafter.

The present invention is embodied in a conveyor having track means provided with a wheel path and wheel engaging means moved over the path by propulsion means for engaging the periphery of a vehicle wheel and moving it along the path. Means are provided for facilitating the passage of the vehicle wheel over the wheel engaging means. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur:

FIGS. 2, 3 and 4 are sectional views taken along lines 2—2, 3—3, and 4—4, respectively, of FIG. 1;

DETAILED DESCRIPTION

Figure 1:
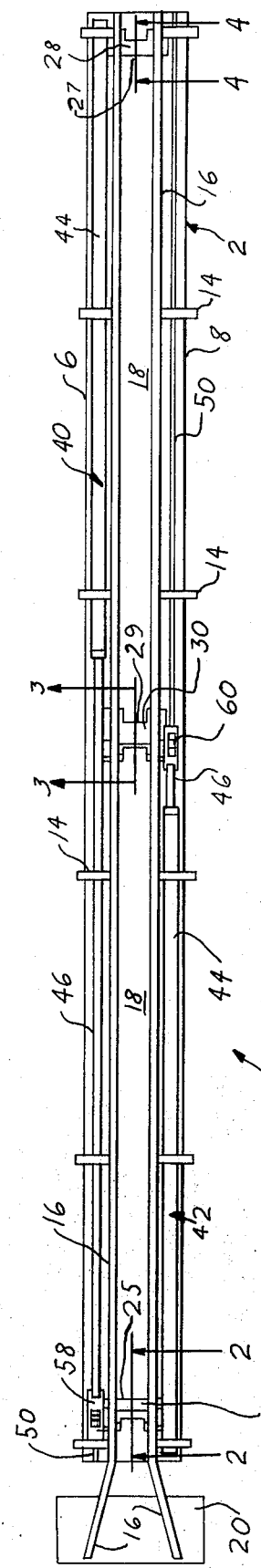
FIG. 1 is a plan view of a conveyor constructed in accordance with and embodying the present invention.

Referring now to the drawings (FIG. 1), C designates a conveyor which is mounted on the floor F of a car wash installation for moving wheeled vehicles through the car wash installation. The car wash installation may be a service station bay. The conveyor C extends substantially the entire length of the car wash installation and moves vehicles past car washing equipment such as water jets, brushes, hot air nozzles, and the like.

The conveyor C includes a track member 2 having a flat base plate 4 (FIG. 6) which lies on the floor F and is turned upwardly along its sides in the formation of side flanges 6 and 8. Welded to the outwardly presented faces of the side flanges 6 and 8 are mounting brackets 10, and extended through these brackets are bolts 12 which secure the track 2 to the floor F.

Also welded to the side flanges 6 and 8 of the track 2 are guide rail brackets 14 (FIG. 6) which project inwardly therefrom. The guide rail brackets 14 are initially directed upwardly from the flanges 6 and 8 at an oblique angle and then horizontally, and welded to the innermost ends of the brackets 14 are tire guide rails 16. The spacing between the two guide rails 16 is enough to accommodate an automobile tire T and keep that tire directed on a straight course along the track 2. The portion of the base plate 4 located directly beneath the space between the two guide rails 16 is for the most part flat and unobstructed and constitutes a tire path 18 along which the tire T rolls. The guide rails 16 extend the entire length of the track 2, (FIG. 1), beginning beyond the entrance of the track. The rails 16 converge over a correlator 20 which is a free moving plate of substantial width positioned to move transversely of the track 2. Hence, front and rear tires T which do not align with the tire path 18 upon approaching the entrance to the track 2 will engage the converging portion of one of the guide rails 16 and will be guided laterally on the correlator 20 to an aligned position at the entrance to the track 2.

The brackets 14 of the track 2 also support covers 22 (illustrated in FIG. 6 only) which overlie but are spaced upwardly from the portions of the base plate 4 on each side of the tire path 18. These covers 22 are removable and provide protection for the operating mechanisms and operating personnel.

To facilitate fabrication and assembly of the conveyor C, the track member 2 may be made in sections of any suitable length. This enables the conveyor C to be fabricated at a convenient manufacturing facility and then shipped to and assembled at the car wash installation.

The track 2 near its entrance is provided with a shallow roller pan 24 (FIG. 2) which is set into the floor F. The base plate 4 of the track 2 covers a substantial portion of the pan 24, but the plate 4 is provided with a generally U-shaped opening 25 (FIGS. 1, 2 and 6) which extends completely across the tire path 18 and provides access to the pan 24. At its leading end, the pan 24 has an inclined surface 26 (FIG. 2) which extends up to the leading edge of the opening 25 in base plate 4.

Likewise, at its discharge end the track 2 is provided with another U-shaped opening 27 (FIG. 1) and a shallow roller pan 28 (FIG. 4) underlying that opening. The roller pan 28 has its inclined surface 26 at the trailing end thereof, and this surface leads up to the trailing end of the opening 27.

Generally midway between its ends the track 2 has still another opening 29 (FIG. 1) and a shallow roller pan 30 (FIG. 3) beneath that opening 29. The opening resembles the letter H in configuration, while the pan 30 has an inclined camming member 32 at one side thereof.

Each of the roller pans 24, 28 and 30 extends completely across the tire path 18 and terminates generally under the tire guide rails 16, that is the legs of the U or H configurations are under the guide rails 16.

Figure 7:
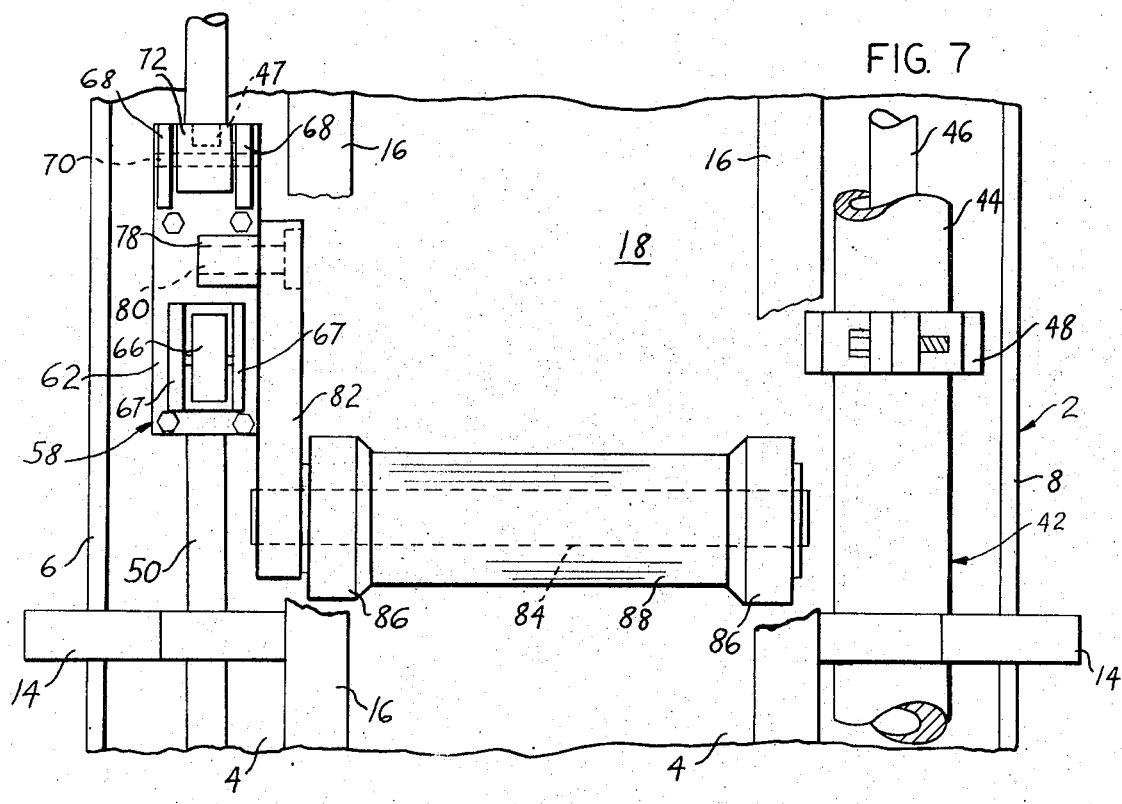
FIG. 7 is an enlarged plan view of the carriage and its rollers.

Mounted on each side of the tire path 18 are first and second propulsion cylinders 40 and 42 (FIG. 1) which are of the double acting variety. Each includes a barrel 44 and a piston rod 46 which extends from and retracts into the barrel 44. Each piston rod 46 has a threaded outer end 47 (FIG. 7). The barrels 44 of the two cylinders 40 and 42 are embraced by clamp type cylinder mounts 48 the lower portions of which hook into trackways welded to the base plate 4. The cylinder mounts 48 are split and are held together by bolts so that these cylinders 40 or 42 may be removed from them. The barrels 44 of the two cylinders 40 and 42 incorporate a mounting eye at the end opposite the rod. A bolt fastens through the mounting eye and into a threaded block welded to the track 2 to position the cylinders and prevent longitudinal movement during extending and retracting of the rod 46. The first propulsion cylinder 40 is positioned adjacent to the side flange 6 of the track 2 with its barrel 44 extending generally between the intermediate roller pan 30 at the midportion of the track 2 and the terminal roller pan 28 at the discharge end of the track 2. Moreover, the piston rod 46 projects towards the entrance of the track 2 and when extended will reach all the way to the beginning roller pan 24. However, when the piston rod 46 of the cylinder 40 is fully retracted its outer threaded end 47 will be located next to the intermediate roller pan 30.

The second propulsion cylinder 42, is mounted adjacent to the side flange 8 with its barrel 44 extending generally between the beginning roller pan 24 and the intermediate roller pan 30, and with its piston rod 46 projecting toward the discharge end of the track 2. When the piston rod 46 is retracted, its outer threaded end 47 is located next to the intermediate roller pan 30 and when extended its outer threaded end 47 is located next to the terminal roller pan 28.

Figure 6:
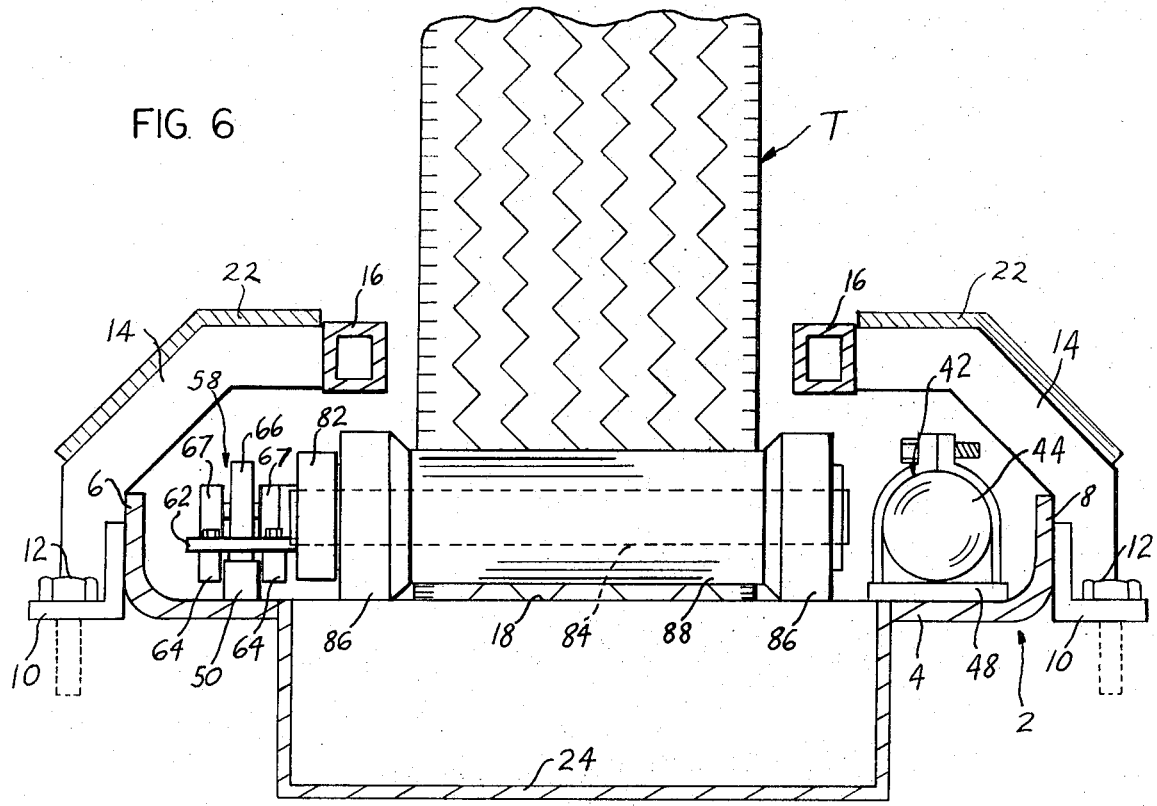
FIG. 6 is a sectional view along 6—6 of FIG. 5 and showing the carriage and rollers thereof in elevation form behind.

Welded to the portions of the track 2 over which the piston rods 46 move are carriage guides 50 (FIGS. 6 & 7). Each carriage guide 50 is of rectangular cross section and is set outwardly from the tire guide rails 16.

The carriage guides 50 support carriages 58 and 60 (FIGS. 2, 3, 6 & 7), which are operated by the cylinders 40 and 42, respectively. Since both carriages 58 and 60 are substantially the same in construction, only the carriage 58 operated by the first propulsion cylinder 40 will be described in detail. That carriage operates along the carriage guide 50 located adjacent to the side flange 6 of the track 2, that is the guide 50 which extends generally between the beginning pan 24 and the intermediate pan 30. The first carriage 58 includes (FIGS. 6 & 7) a carriage plate 62 which overlies the carriage guide 50 and is fitted with the guide rollers 64, two rollers 64 being positioned on each side of the carriage guide 50. The guide rollers 64 engage the side faces of the carriage guide 50, and while permitting the carriage 58 to move longitudinally along the track 2, they prevent the carriage 58 from moving laterally with respect to the track 50. The carriage plate 62 is apertured generally between the guide rollers 64 and this aperture receives a support roller 66, the periphery of which projects slightly below the lower surface of the carriage plate 62 where it engages the upper surface of the carriage guide 50. The support roller 66 rotates about an axle carried by tabs 67 projecting upwardly from the carriage plate 62. The roller 66 supports the plate 62 in a slightly elevated position above the carriage guide 50, and further reduces friction between the carriage 58 and guide 50 to an absolute minimum. The end of the carriage plate 62 located closest to the propulsion cylinder 40 has a pair of upstanding brackets 68 which are bridged by a pivot pin 70. Aside from extending through the brackets 68, the pivot pin 70 also projects through a connecting block 72 which is threaded to receive the threaded end 47 of the piston rod 46. Thus, the carriage 58 is connected to the piston rod 46 and will move along the carriage guide 50 as the piston rod 46 extends from and retracts into the barrel 44. The connecting block 72 also acts to prevent the carriage plate 62 from rotating about the pivot pin 70 during movement under load. Sufficient clearance is provided between the brackets 68 and the connecting block 72 to allow lateral movement and thereby accommodate any misalignment between the carriage 58 and the operating cylinder 40.

Also welded to the carriage plate 62 generally intermediate its ends is a pivot block 78 (FIGS. 3 & 7) of substantial strength, and this block has a horizontal spindle 80 projecting from it toward the tire path 18. The spindle 80 supports one end of a swing arm 82, and that arm is free to swing upwardly and downwardly about the spindle 80. The opposite end of the swing arm 82 is fitted with an axle 84 (FIGS. 6 & 7) which projects completely across the tire path 18 of the track 2. The axle 84 extends horizontally and is perpendicular to the longitudinally axis of the track 2. It projects through a pair of support rollers 86 with one support roller 86 being located at each end thereof. The support rollers 86 are disposed generally beneath the tire guide rails 16 and consequently the spacing between them is about the width of the tire path 18. The portion of the axle 84 between the support rollers 86 serves as a journal for a tire drive roller 88, the diameter of which is slightly less than the diameter of the support rollers 86. Hence, the support rollers 86 maintain the tire drive roller 88 in an elevated position above the tire path 18. The length of the tire drive roller 88 is such that it will extend completely across the tread of the tire T. The drive roller 88 is journaled on the axle 84 independently of the support rollers 86 so it can rotate in the opposite direction.

Also mounted on the carriage base 62 at its end opposite to the cylinder rod 46 is a removable scraper plate 90 and a like plate 92 mounted to the cylinder rod 46 prior to the connecting block 72. The scraper plates 90 and 92 clear the guide 50 of any debris and thereby prevent jamming of the guide rollers 64 and support roller 66. The scraper plates 90 and 92 extend down to the carriage guide 50 and are notched to extend along sides of the guide 50. They are constructed of an antifriction material and are replaceable.

The opening 25 for beginning roller pan 24 is wide enough and long enough to receive the rollers 86 and 88 on the axle 84, as is the pan 24 itself (FIG. 6). Moreover, the length of the swing arm 82 is such that it allows the rollers 86 to drop to the bottom of the beginning pan 24 whenever the first carriage 58 brings those rollers to the pan 24 (FIG. 2). The depth of the pan 24 is such that when the rollers 86 and 88 are at the bottom thereof, the peripheries of those rollers 86 and 88 will be below the upper surface of the base plate 4.

Figure 5:
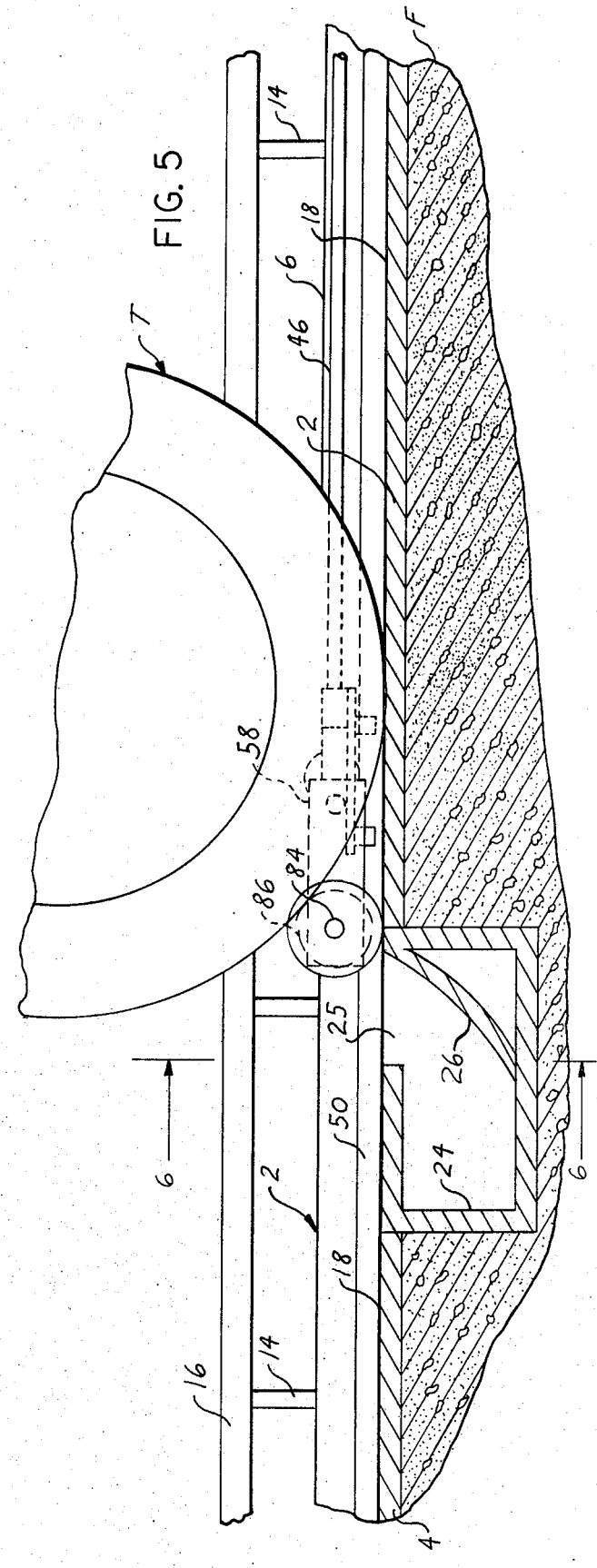
FIG. 5 is a sectional view in elevation showing the carriage drive roller engaging an automobile tire from behind immediately after the drive roller emerges from the beginning roller pan in the track.

The inclined surface 26 in the beginning pan 24 enables the support rollers 86 of the first carriage 58 to roll out of the pan 24 and onto the tire path 18 when the piston rod 46 of the first cylinder 40 is retracted (FIG. 5). Conversely, when the piston rod 46 of the first cylinder 40 is extended, the carriage 58 will reach a point at which the support rollers 86 will roll down the inclined surface 26 so that the rollers 86 and 88 are housed completely within the beginning pan 24. One of the legs in the U-shaped opening 25 over the beginning pan 24 accommodates the swing arm 82 of the carriage 58 when the rollers 86 and 88 of that carriage are in the pan 24.

The terminal roller pan 28 (FIG. 4) is configured to receive the rollers 86 and 88 of the second carriage 60, that is the carriage 60 propelled by the second cylinder 42, in a like manner. Since the inclined surface 26 of the terminal pan 28 is located toward the entrance of the track 2, the support rollers 86 of the second carriage 60 will roll down the inclined surface and into the pan 28 as the piston rod 46 of cylinder 42 extends. Conversely, when the piston rod 46 of the second cylinder 42 retracts, the support rollers 86 will roll up the inclined surface 26 and onto the base plate 4 of the track 2.

The intermediate roller pan 30 is large enough to accommodate the rollers 86 and 88 of both carriages 40 and 42 with the rollers 86 and 88 of the first carriage 58 being ahead of the rollers 86 and 88 of the second carriage 60. Again, the depth of the intermediate pan 30 is such that when the rollers 86 and 88 are in the pan 30, the peripheries of those rollers 86 and 88 will be below the upper surface of the base plate 4. The camming member 32 is positioned along that side wall of the pan 30 located closest to the track flange 6 and does not project far enough into the pan 30 to interfere with the rollers 86 of either of the carriages 58 or 60 when those rollers are in the pan 30. However, the camming member 32 is in the path of the swing arm 82 for the first carriage 58 and will lift that swing arm 86 upwardly to enable the rollers 86 and 88 carried thereby to clear the opening 29 when the piston rod 46 of the first cylinder 40 is extended. The rollers 86 and 88 of the second carriage 60, that is the carriage propelled by the cylinder 42, leave the pan 30 and emerge from the opening 29 by climbing over the rollers 86 and 88 of the first carriage 58. Thus, the rod 46 of the second cylinder 42 is extended only after the rod 46 of the first cylinder 42 is fully retracted and the rollers 86 and 88 propelled thereby are in the pan 30.

The barrels 44 of the first and second propulsion cylinders 40 and 42 are connected through valves (not shown) to a source of high pressure fluid which may be either compressed air or hydralic fluid. A control system is provided for operating the valves in the sequence which will become apparent from the following description of the operation of the conveyor C.

OPERATION

The conveyor C is used to move wheeled vehicles and is ideally suited for use with car washing equipment. In such an application the washing equipment is arranged in the proper sequence along the conveyor C.

In its ready position, that is when the conveyor C is awaiting an automobile to be conveyed by it, the piston rod 46 of the first propulsion cylinder 40 is completely extended, in which case the support rollers 86 and drive roller 88 on the first carriage 58 will be in the beginning roller pan 24 (FIGS. 1 & 2). The piston rod 46 of the second propulsion cylinder 42, on the other hand, will be retracted and the second carriage 60 will position its support rollers 86 and drive roller 88 at the rear end of the intermediate roller pan 30 (FIG. 3). The rollers 86 and 88 of that second carriage 60 will be housed completely within the pan 30. Since the drive rollers 88 of the first and second carriages 58 and 60 are housed in the beginning roller pan 24 and the intermediate roller pan 30, respectively, the tire path 18 along the base plate 4 of the track 2 remains unobstructed.

With the conveyor C in its ready position, an automobile is driven toward it such that the tires T on one side of the vehicle-preferably the left side — align with the converging portions of the guide rails 16. These converging portions cooperate with the correlator 20 to correct any misalignment of the tire T with the path 18. Thus, as the automobile advances its front tire T will roll onto the tire path 18 and to a position a short distance beyond the entrance to the track 2. In so doing, the tire T will also roll over the opening 25 to the beginning roller pan 24. In this connection, it should be noted that the opening 25 is quite small in comparison to the diameter of the tire T, and as a result the tire T does not sink to any appreciable extent into the roller pan 24.

Once the front tire T has passed beyond the beginning roller pan 24, the first propulsion cylinder 40 is energized to retract the piston rod 46 into the barrel 44 thereof. As this occurs, the first carriage 58 moves along its carriage guide 50 and its support rollers 86 roll up the inclined surface 26 and onto the base plate 4 of the track 2. The support rollers 86 furthermore bring the tire drive roller 88 up with them, and this roller engages the back side of the tread on the tire T (FIG. 5). Continued movement of the carriage 58 moves the tire T along the tire path 18, causing the automobile to be advanced along the conveyor C.

As the piston rod 46 of the first cylinder 40 approaches its fully retracted position, the drive roller 88 on the first carriage 58 will move the tire T over the intermediate roller pan 30, in which case the tire T passes over the drive roller 88 of the second carriage 60, which roller is housed within that intermediate pan 30. Indeed, the rollers 86 and 88 of the first carriage 58 also roll over the rollers 86 and 88 of the second carriage 50, which rollers are in the pan 30, and immediately after passing over those rollers drop through the opening 29 and into the unoccupied space of the intermediate roller pan 30. The camming member 32 in the pan 30 engages the swing arm 82 of the first carriage 58 and guides the rollers 86 and 88 of that carriage away from the rollers 86 and 88 of the second carriage 60.

Once the rollers 86 and 88 of the first carriage 58 drop into the intermediate pan 30, the second cylinder 42 is energized to extend the piston rod 46 from the barrel 48 thereof. This moves the second carriage 60 toward the discharge end of the track 2, and as that carriage 60 moves its support rollers 86 climb up over the support rollers 86 of the first carriage 58, which rollers have just dropped into the intermediate pan 30. The support rollers 86 propelled by the second cylinder 42 move out of the opening 29 and onto the base plate 4 and position the tire drive roller 88 behind the tread of the tire T. As the second carriage 60 continues to advance, the tire T is driven toward the terminal end of the conveyor C. When the piston rod 46 of the second cylinder 42 reaches its fully extended position, the second carriage 60 propelled thereby will be located next to the terminal roller pan 28 and the rollers 86 and 88 will drop into that roller pan.

Referring again to the first propulsion cylinder 40, it remains inactive long enough for the rear tire T of the automobile to pass the intermediate pan 30, and when this occurs, the first propulsion cylinder 40 is energized to extend the piston rod 46. As the piston rod 46 extends it moves the first carriage 58 toward the entrance of the track 2, and this causes the support rollers 86 of the first carriage 58 to climb out of the intermediate pan 30. The piston rod 46 is extended until the rollers 86 and 88 of the first carriage 58 again drop into the beginning roller pan 24, in which case the conveyor C is ready to accept another automobile.

Once the front tire T of the automobile passes beyond the terminal roller pan 28, the automobile is driven off of the conveyor C under its own power. The second propulsion cylinder 42 remains inactive long enough for the rear tire of the automobile to clear the terminal roller pan 30, and once this has occurred, the second cylinder 42 is energized to retract its piston rod 46. As the piston rod 46 retracts the support rollers 86 of the second carriage 60 climb up the inclined surface 26 of the terminal pan 28 and onto the base plate 4. The piston rod 46 of the second cylinder 42 is brought to its fully retracted position and the rollers 86 and 88 propelled thereby will again drop into the intermediate pan 30, so as to be positioned to again propel another tire T over the last half of the track 2.

Since the track 2 is substantially longer than an automobile, both cylinders 40 and 42 may be operated at the same time to advance their respective carriages 58 and 60, in which case some overlap is available and two automobiles may be conveyed over the track 2 at the same time.

The conveyor C may be installed on existing floors F by making small pockets to accommodate the roller pans 24, 28 and 30. This is a minor alteration. In view of this fact the conveyor C is ideally suited for use in the bays of existing service stations.

This invention is intended to cover all changes and modifications of the example of the invention herein chosen for purposes of the disclosure which do not constitute departures from the spirit and scope of the invention.

What is claimed is:

1. A conveyor for wheeled vehicles, said conveyor comprising a track defining a path along which a vehicle wheel rolls in a direction of advance, the track having at least two recesses opening out of the path thereof, a fluid operated cylinder assembly located along the track with its axis parallel to the path, a drive roller moved by the cylinder assembly over the path in the direction of advance and in the opposite return direction, the movement of the roller being between the recesses, whereby the drive roller when moved in the direction of advance will engage the periphery of a vehicle wheel located on the path beyond the first recess encountered by the wheel and will move the vehicle wheel in the direction of advance, connecting means connecting the drive roller with the cylinder assembly such that the axis of rotation for the drive roller is continually perpendicular to the direction of advance for the vehicle wheel, the connecting means permitting the drive roller to drop into the recesses to enable the vehicle wheel to pass over the roller.

2. A conveyor according to claim 1 wherein the drive roller is located completely below the path when in the recess.

3. A conveyor according to claim 2 which further comprises support rollers of slightly greater diameter than the drive roller, the support rollers being rotatable independently of the drive roller and about the same axis as the drive roller, the support rollers being positioned to engage and roll along the track whereby the drive roller will be elevated above the path on the track.

4. A conveyor according to claim 3 wherein the fluid operated cylinder assembly includes a barrel secured to the track and a piston rod which extends from and retracts into the barrel, the piston rod being connected with the rollers through the connecting means for moving the rollers over the track.

5. A conveyor according to claim 3 wherein the connecting means includes a common axle on which the support and drive rollers are mounted, a swing arm connected with the cylinder assembly and pivoted about a horizontal axis oriented transversely of the track, the common axle projecting over the path remote from the horizontal axis, whereby the swing arm will pivot downwardly and permit the rollers to drop into the recesses.

6. A conveyor according to claim 5 wherein a carriage guide is connected to the track along the side of the path; wherein the connecting means further comprises a carriage which is mounted on and moves along the carriage guide; wherein the swing arm is connected to and pivots relative to the carriage, and wherein the cylinder assembly is connected to and moves the carriage, whereby the support rollers will move along the track.

7. A conveyor according to claim 6 wherein the fluid operated cylinder assembly includes a barrel secured to the track and a piston rod which extends from and retracts into the barrel, the piston rod being connected to the carriage.

8. A conveyor for wheeled vehicles, said conveyor comprising track means defining a path along which the wheel of a vehicle rolls, at least two wheel engaging rollers positioned to engage the periphery of a wheel on the path from behind the wheel, propulsion means for moving the wheel engaging rollers along the track and over the path between starting and terminal positions, the movement being in both directions so that in one direction of movement the wheel engaging rollers will propel the wheel along the track and in the other direction of movement the wheel engaging rollers will move back to their starting positions wherein they can engage another wheel from behind, and means defining depressions in the track at the starting and terminal positions for each roller for receiving the wheel engaging rollers so that each roller will be received in a depression when in its starting and terminal positions to facilitate the passage of vehicle wheels over the rollers.

9. A conveyor according to claim 8 wherein the rollers engage the same vehicle wheel in succession; and wherein the roller first to engage the vehicle wheel passes over the roller second to engage the vehicle wheel as the first roller approaches its terminal position.

10. A conveyor according to claim 8 wherein the propulsion means comprises a fluid operated cylinder for each wheel engaging roller.

11. A conveyor according to claim 10 wherein the fluid operated cylinders are on opposite sides of the path and one retracts to advance its roller while the other extends to advance its roller.

* * * * *